United States Patent
Hanks (10) Patent No.: US 7,324,129 B2
(45) Date of Patent: Jan. 29, 2008

(54) OPTICAL PRINT HEAD POSITIONING USING MECHANICALLY COUPLED OPTICAL PICKUP UNIT

(75) Inventor: D. Mitchel Hanks, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 292 days.

(21) Appl. No.: 11/127,591

(22) Filed: May 12, 2005

(65) Prior Publication Data
US 2006/0256184 A1 Nov. 16, 2006

(51) Int. Cl.
*B41J 2/47* (2006.01)
(52) U.S. Cl. .................................................... 347/225
(58) Field of Classification Search .......... 347/224–225, 347/229; 369/30.15, 44.14, 53.19
See application file for complete search history.

(56) References Cited

U.S. PATENT DOCUMENTS

| | | | |
|---|---|---|---|
| 5,235,574 A * | 8/1993 | Aviles et al. ............ 369/53.19 |
| 5,518,325 A | 5/1996 | Kahle |
| 5,682,362 A * | 10/1997 | Suzuki et al. ............ 369/30.15 |
| 6,532,034 B2 * | 3/2003 | Hirotsune et al. .......... 347/229 |
| 6,532,199 B1 * | 3/2003 | Getreuer et al. ......... 369/44.14 |
| 2001/0035886 A1 | 11/2001 | Bradshaw et al. |
| 2003/0161224 A1 | 8/2003 | Anderson et al. |
| 2003/0185144 A1 | 10/2003 | Anderson et al. |
| 2004/0056944 A1 | 3/2004 | Bronson |
| 2005/0041091 A1 | 2/2005 | Sawyer |

FOREIGN PATENT DOCUMENTS

| | | |
|---|---|---|
| EP | 1308938 | 5/2003 |
| JP | 09265760 A * | 10/1997 |
| JP | 2003019828 | 1/2003 |
| JP | 2005050409 | 2/2005 |
| JP | 2005346798 | 12/2005 |
| WO | WO2005119679 | 12/2005 |

OTHER PUBLICATIONS

International Search Report for Application No. PCT/US2006/017625. Report issued Sep. 28, 2006.

\* cited by examiner

*Primary Examiner*—Hai Pham (57) ABSTRACT

An optical print head (OPH) on the label side of an optical disc is positioned to a desired labeling position through a mechanical coupling between the OPH and an optical pickup unit (OPU) at the data side of the optical disc. The OPU is positioned to a target data track on the data side of the disc, and the OPH is moved to a desired label position through the mechanical coupling.

26 Claims, 6 Drawing Sheets

OPTICAL PRINT HEAD POSITIONING USING MECHANICALLY COUPLED OPTICAL PICKUP UNIT

BACKGROUND

An optical disc is an electronic data storage medium that can be written to and read from using a low-powered laser beam. For example, a CD (compact disc) is typically used to record, store, and play back various media such as audio, video and text in digital form, while a DVD (digital versatile disc) is generally used for storing and playing back whole movies due to its increased storage capability.

Recordable and rewritable disc drives for both CDs and DVDs have become common place, enabling the average consumer to record and rewrite their own data onto their own CDs and DVDs by "burning" the data into, for example, CD-Rs (CD-recordable discs), CD-RWs (CD-rewritable discs), DVD+Rs (DVD-recordable discs), and DVD+RWs (DVD-rewritable discs). The ability to create personalized collections of data on CDs and DVDs has driven consumer desire for convenient ways to identify the data in such collections. Accordingly, methods for labeling the non-data side of optical discs (e.g., CDs, DVDs) have developed from physically writing on the non-data side of a disc with a permanent marker, for example, to using the laser in a conventional CD player to mark a specially prepared CD surface.

In general, a label image can be rendered on the label surface of an optical disc (i.e., the non-data side, or top side) by marking the label surface with a laser beam along concentric circles around the disc. For each circle, spots of constant size and optical density are marked by the laser according to marking data for that circle. However, because there are typically no markings or other reference points on the non-data/label side of a disc, accurately positioning the laser in the radial direction of the disc has remained a challenging problem.

BRIEF DESCRIPTION OF THE DRAWINGS

The same reference numerals are used throughout the drawings to reference like components and features.

DETAILED DESCRIPTION

Introduction

The following discussion is directed to disc media marking systems and methods that enable the positioning of an optical print head (OPH) at the label side, or non-data side (top side), of an optical disc for the precise spacing of label tracks printed by the OPH. A mechanical coupling between the OPH and an optical pickup unit (OPU) at the data side of the disc couples the motion of the OPU to the OPH. Thus, the positioning capability of the OPU is leveraged to accurately position the label-side OPH for printing a label onto the disc. Data side tracks are used to microstep the OPU sled on the data side of the disc which, in turn, provides precise positioning of the OPH at the label side of the disc through the mechanical coupling. Benefits of the described system and methods include the ability to leverage data track positioning information and OPU positioning capability and components (e.g., sled motor, fine actuator) already present in single-head disc marking systems to achieve precise spacing of label tracks printed by an OPH in a dual-head disc marking system.

Exemplary Environment

Figure 1:
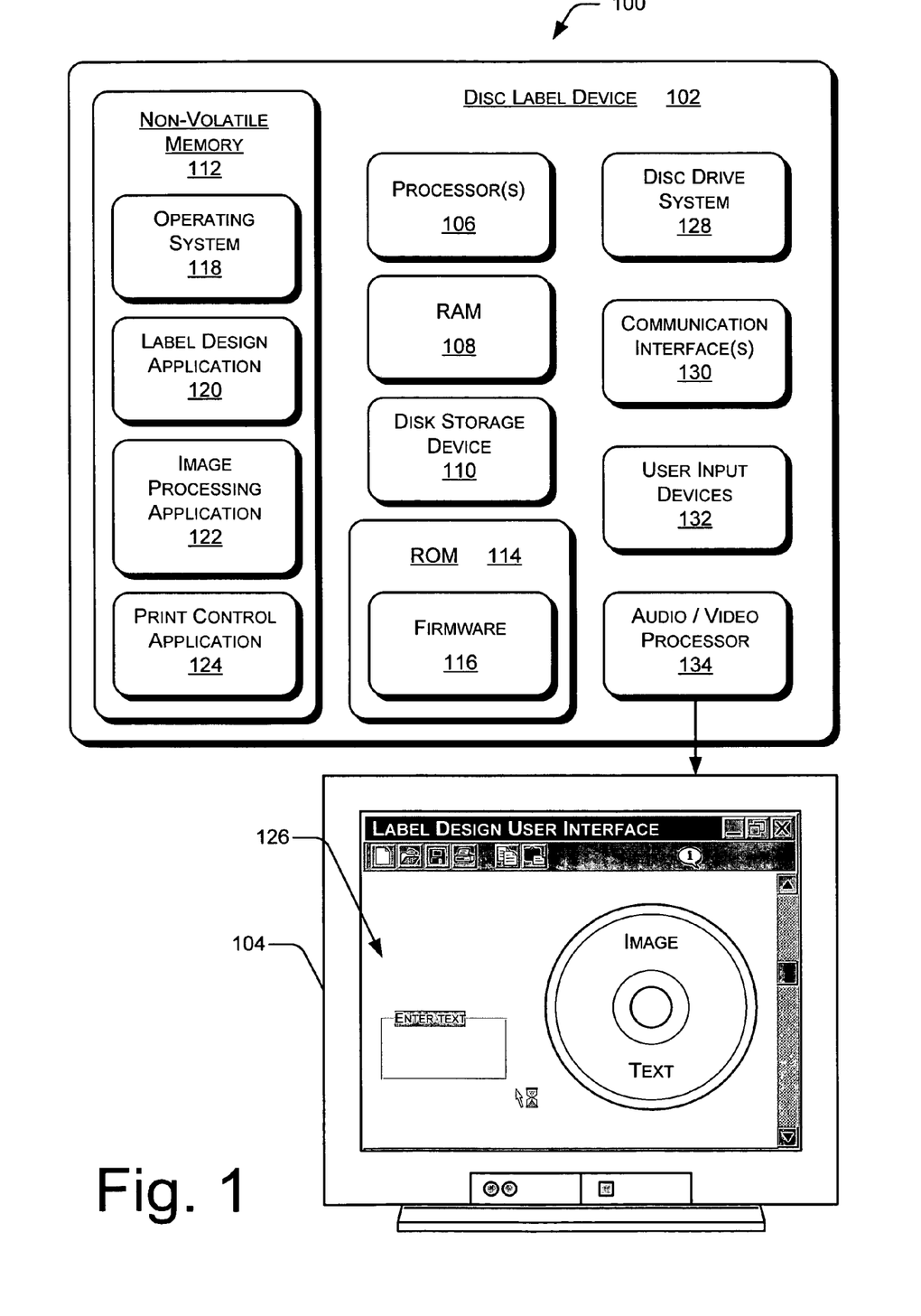
FIG. 1 illustrates an exemplary embodiment of a disc media marking system.

FIG. 1 illustrates an exemplary embodiment of a disc media marking system 100 suitable for positioning an optical print head (OPH) at the non-data/label side of an optical disc using the positioning capability of, and a mechanical coupling to, an optical pickup unit (OPU) positioned at the data side of the disc. The exemplary disc media marking system 100 includes a disc media marking device 102 and a display device 104. The disc media marking device 102 can be implemented as a stand-alone appliance device for labeling disc media. Alternatively, the disc media marking device 102 can be integrated as part of an optical media player or drive, such as a writable compact disc (CD) player that is implemented to label an optical disc as well as record data onto a CD-R (CD-recordable disc) and/or a CD-RW (CD-rewritable disc). Such writable CD devices may include, for example, a stand-alone audio CD player that is a peripheral component in an audio system, a CD-ROM drive integrated as standard equipment in a PC (personal computer), a DVD (digital versatile disc) player, and any number of similar embodiments.

Disc media marking device 102 includes one or more processors 106 (e.g., any of microprocessors, controllers, and the like) that process various instructions to control the operation of disc media marking device 102 and communicate with other electronic and computing devices. Disc media marking device 102 can be implemented with one or more memory components, examples of which include a random access memory (RAM) 108, a disk storage device 110, and non-volatile memory 112 (e.g., any one or more of a read-only memory (ROM) 114, flash memory, EPROM, EEPROM, etc.).

Disk storage device 110 can include any type of magnetic or optical storage device, such as a hard disk drive, a magnetic tape, a recordable and/or rewriteable compact disc (CD-R, CD-RW), a recordable and/or rewriteable digital versatile disc (DVD+R, DVD+RW) and the like. The one or more memory components provide data storage mechanisms to store various information and/or data such as configuration information for disc media marking device 102, graphical user interface information, and any other types of information and data related to operational aspects of disc media marking device 102. Alternative implementations of disc media marking device 102 can include a range of processing and memory capabilities, and may include any number of differing memory components than those illustrated in FIG. 1.

Disc media marking device 102 includes a firmware component 116 that is implemented as a permanent memory module stored on ROM 114, or with other components in disc media marking device 102, such as a component of a processor 106. Firmware 116 is programmed and distributed with disc media marking device 102 to coordinate operations of the hardware within disc media marking device 102 and contains programming constructs used to perform such operations.

An operating system 118 and one or more application programs can be stored in non-volatile memory 112 and executed on processor(s) 106 to provide a runtime environment. A runtime environment facilitates extensibility of disc media marking device 102 by allowing various interfaces to be defined that, in turn, allow the application programs to interact with disc media marking device 102. In this example, the application programs include a label design application 120, an image processing application 122, and a print control application 124.

The label design application 120 generates a label design user interface 126 for display on display device 104 from which a user can create a label image to be rendered on a disc media, such as on an optical disc. A user can specify, or otherwise drag-and-drop text, a bitmap image for background, a digital photo, a graphic or symbol, and/or any combination thereof to create the label image on the user interface 126.

Figure 2:
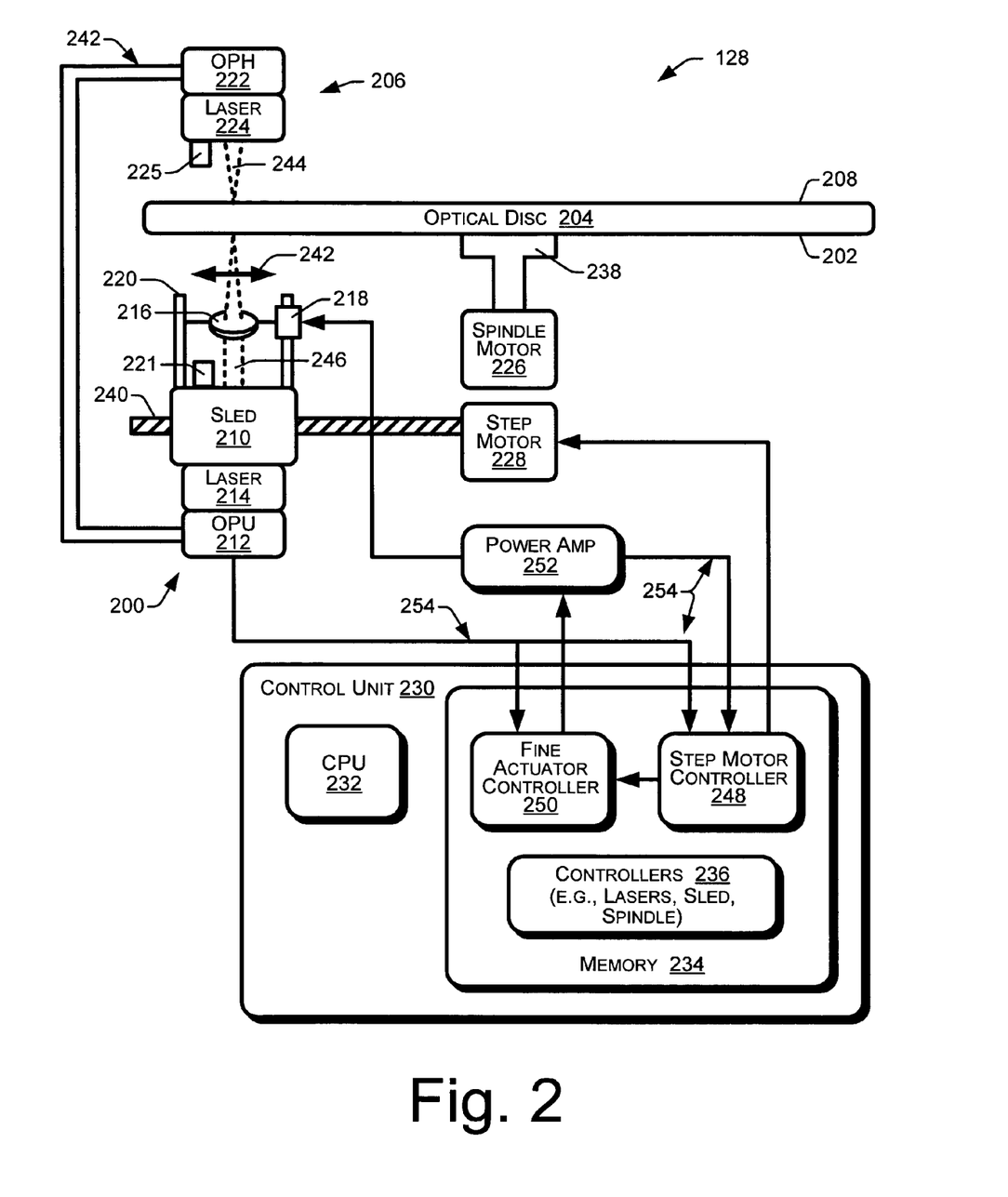
FIG. 2 illustrates an exemplary embodiment of a disc drive system as a component of the disc media marking system of FIG. 1.
Figure 3:
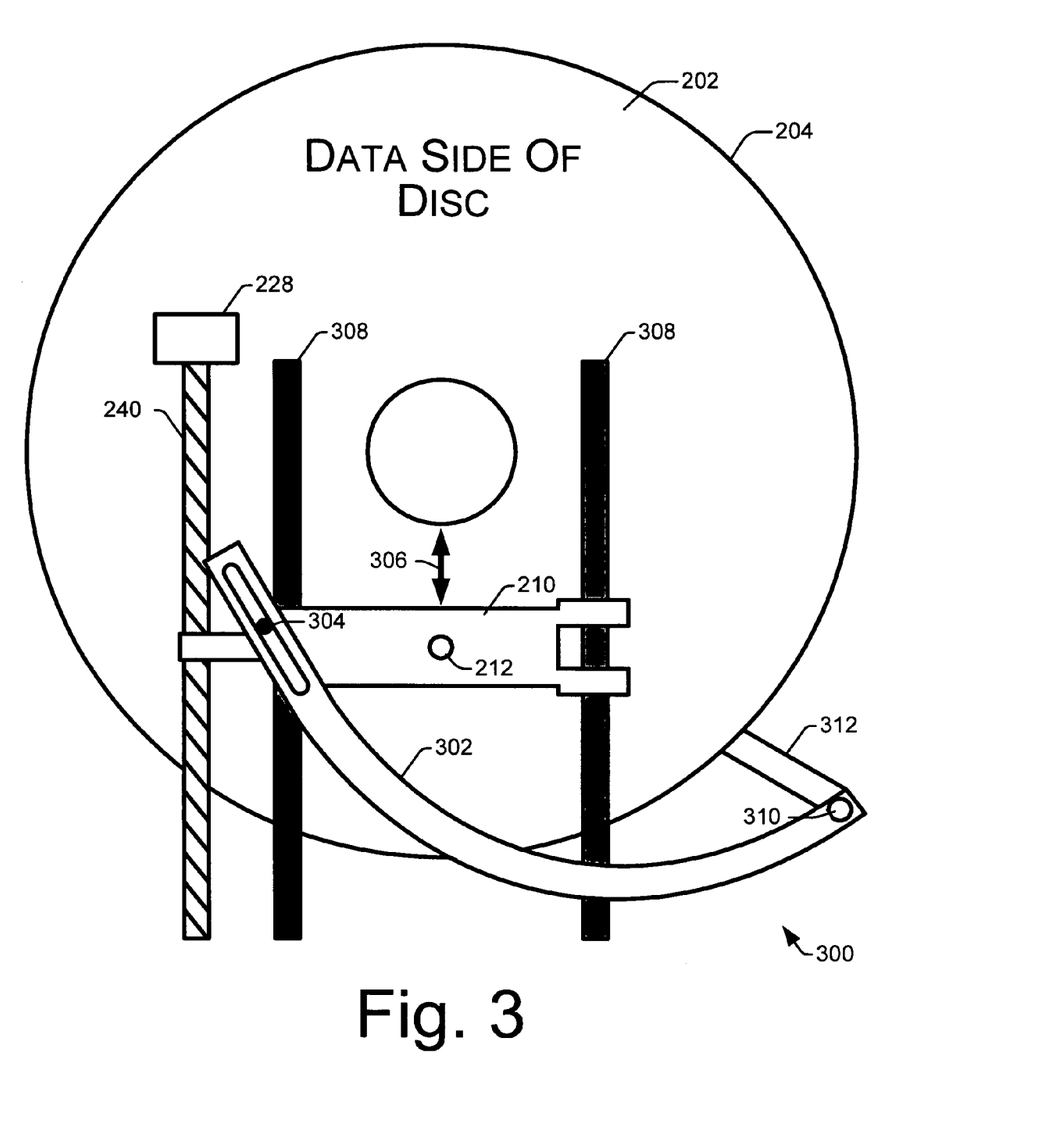
FIG. 3 illustrates an exemplary embodiment of a disc drive system that incorporates an exemplary embodiment of a mechanical coupling.
Figure 4:
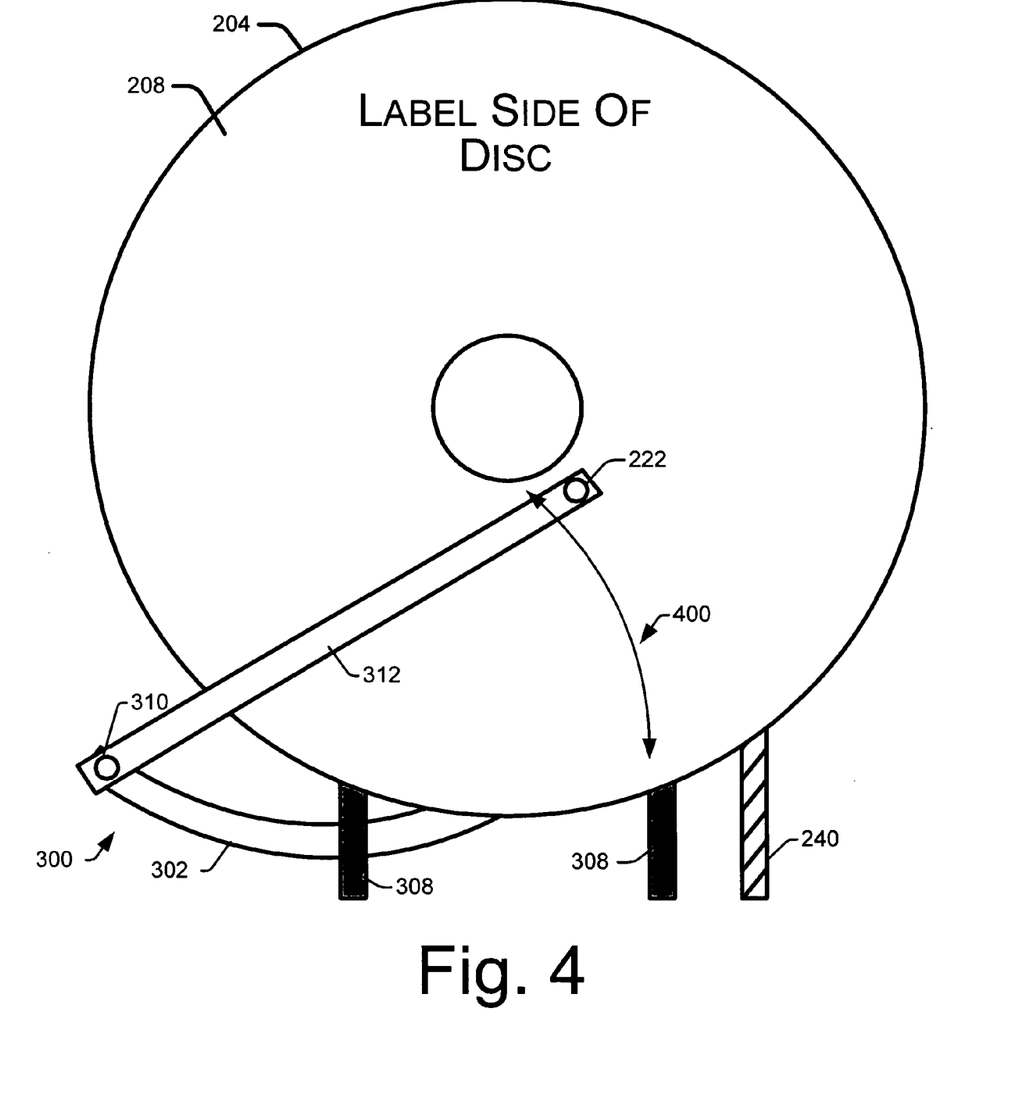
FIG. 4 illustrates an exemplary embodiment of a disc drive system that incorporates an exemplary embodiment of a mechanical coupling.

The image processing application 122 processes the label image created with the label design user interface 126 to produce a data stream of label image data and laser control data to control rendering the image on concentric circular or spiral tracks of a disc media, such as optical disc 204 (FIGS. 2-4). For example, a continuous tone RGB (red, green, and blue) rectangular raster graphic of the label image can be converted to concentric circular tracks. The curved raster is color mapped and separated into the printing color channels KCMY (black, cyan, magenta, and yellow), or grayscale. This data stream is formatted as laser control data and is augmented with other control commands to control the disc media marking device 102 rendering a label on the optical disc 204 (FIGS. 2-4). A label file is generated that can be communicated to a controller where the label file is parsed to control a labeling mechanism. Alternatively, the concentric circular tracks may be generated and streamed to the disc media marking device 102 one track at a time to utilize host processing with the device's rendering process.

The print control application 124 determines the radius of the first track and the subsequent track spacing. After the radius of the first track and the track spacing are determined, the print control application 124 determines which label image data will correspond to each respective track. The laser mark locations along a particular track are specified in a coordinate system where the concentric circular tracks are defined in coordinates of the radial distance and the distance along each respective track.

Disc media marking device 102 includes a disc drive system 128 that can be implemented to mark on a surface of a disc media (i.e., optical disc), such as to render a label image on a label surface 208 (e.g., the non-data side) of optical disc 204 (FIGS. 2-4). The disc drive system 128 is described in greater detail herein below with reference to FIG. 2.

Disc media marking device 102 further includes one or more communication interfaces 130 that can be implemented as any one or more of a serial and/or parallel interface, as a wireless interface, any type of network interface, and as any other type of communication interface. A wireless interface enables disc media marking device 102 to receive control input commands and other information from an input device, such as from a remote control device or from another infrared (IR), 802.11, Bluetooth, or similar RF input device. A network interface provides a connection between disc media marking device 102 and a data communication network that allows other electronic and computing devices coupled to a common data communication network to send label image data and other information to disc media marking device 102 via the network. Similarly, a serial and/or parallel interface provides a data communication path directly between disc media marking device 102 and another electronic or computing device.

Disc media marking device 102 may include user input devices 132 that can include a keyboard, pointing device, selectable controls on a user control panel, and/or other mechanisms to interact with and input information to disc media marking device 102. Disc media marking device 102 also includes an audio/video processor 134 that generates display content for display on display device 104, and generates audio content for presentation by a presentation device, such as one or more speakers (not shown). The audio/video processor 134 can include a display controller that processes the display content to display corresponding images on display device 104. A display controller can be implemented as a graphics processor, microcontroller, integrated circuit, and/or similar video processing component to process the images. Video signals and audio signals can be communicated from disc media marking device 102 to display device 104 via an RF (radio frequency) link, S-video link, composite video link, component video link, or other similar communication link.

Although shown separately, some of the components of disc media marking device 102 may be implemented in an application specific integrated circuit (ASIC). Additionally, a system bus (not shown) typically connects the various components within disc media marking device 102. A system bus can be implemented as one or more of several types of bus structures, including a memory bus or memory controller, a peripheral bus, an accelerated graphics port, or a local bus using any of a variety of bus architectures. Furthermore, disc media marking device 102 may share a system bus with a host processor.

Exemplary Embodiments

FIG. 2 illustrates an exemplary embodiment of the disc drive system 128 shown in FIG. 1 as a component of the exemplary disc media marking device 102. The disc drive system 128 includes a first, data-side laser assembly 200 generally configured to read data from and write data to data tracks on the data side 202 of an optical disc 204. The disc drive system 128 also includes a second, label-side laser assembly 206 generally configured to write labels onto the label side or non-data side 208 of optical disc 204. The data-side laser assembly 200 includes a sled 210 that supports optical pickup unit 212 (OPU). OPU 212 includes laser 214, laser focusing lens and actuator 216, fine actuator 218, lens supports 220, and sensing photodiode 221. The label-side laser assembly 206 includes optical print head (OPH) 222, which includes OPH laser 224 and detector 225.

The disc drive system 128 also includes a spindle motor 226, step motor 228, and control unit 230. Control unit 230 may be implemented, for example, as a printed circuit board employing a combination of various components discussed above with respect to the disc media marking system 100 of FIG. 1. Accordingly, control unit 230 includes a processor 232 for processing computer/processor-executable instructions from various components stored in a memory 234. Processor 232 is typically one or more of the processors 106 discussed above with respect to the disc media marking system 100 of FIG. 1. Likewise, memory 234 is typically the non-volatile memory 112 and/or firmware 116 from the disc media marking system 100 of FIG. 1.

Controllers 236 generally include laser controllers, a sled controller, actuator controllers, and a spindle controller that are stored in memory 234 and executable on processor 232. A spindle controller drives spindle motor 226 to control a rotational speed of disc 204 via spindle 238. Spindle controller 236 operates in conjunction with a sled controller 236 that drives the step motor 228 to control coarse radial positioning of sled 210 (i.e., laser assembly 200, sled 210, OPU 212, laser 214, etc.) with respect to disc 204 along a sled drive mechanism 240. In turn, a mechanical coupling 242 translates the coarse positioning movements of the OPU 212 to the OPH 222 on the label side 208 of disc 204.

In general, once the OPH 222 is properly positioned, OPH laser beam 244 is generated by OPH laser 222 and focused onto the label surface 208 of optical disc 204. The OPH laser beam 244 creates laser marks that correspond to label image data to render an image of the label on the optical disc 204 as the disc rotates. When marking a label on disc 204, the rotational speed of disc 204 and the radial position of OPH 222 and OPH laser 224 are typically controlled such that laser marks are written onto the disc 204 as the label surface 208 moves past the laser beam 244 at a constant linear velocity. A laser controller 236 controls the firing and intensity of OPH laser beam 244 to write laser marks corresponding to a label image onto disc 204. Likewise, with respect to the OPU 212, another laser driver 236 controls the firing and intensity of OPU laser beam 246 generated by OPU laser 212 to read data from and write data to the data side 202 of the optical disc 204. Both the OPU 212 and OPH 222 can be implemented as photodetectors that provide laser focus feedback to their respective laser drivers 236.

As noted above, disc drive system 128 additionally includes a mechanical coupling 242 that couples the OPU 212 on the data side 202 of optical disc 204 with the OPH 222 on the label side 208 of the disc. It is noted that the mechanical coupling 242 is not limited to a physical coupling between just the OPH 222 and OPU 212. Rather, the mechanical coupling 242 may couple the OPH 222 to any component of the data-side laser assembly 200 or any component associated with the motion of OPU 212 (sled 210) to achieve the same general purpose described herein of leveraging the OPU 212 positioning capability. The mechanical coupling 242 translates motion and positioning of the OPU 212 to motion and positioning of the OPH 222. Thus, accurate positioning of the OPH 222 on the label side 208 of disc 204 depends upon the positioning capability of the OPU 212. The OPU 212 has a precision radial positioning capability enabled by abundant positioning information inherent in the data tracks on the data side 202 of disc 202. The mechanical coupling 242 leverages the positioning capability of the OPU 212 to enable accurate positioning of the OPH 222 and OPH laser 224 on the label side 208 of the disc 202 where there is typically no positioning information present.

FIG. 2 provides a generic illustration of the mechanical coupling 242. The generic mechanical coupling 242 shown in FIG. 2 is intended to indicate a physical coupling between the data-side OPU 212 and label-side OPH 222 that provides a one-to-one correlation of motion and radial positioning of the OPU 212 to the OPH 222. Thus, when the OPU laser beam 246 is positioned at the extreme inner-most radius of disc 204, the OPH laser beam 244 is also positioned at the extreme inner-most radius of disc 204. Likewise, when the OPU laser beam 246 is positioned at the extreme outer-most radius of disc 204, the OPH laser beam 244 is also positioned at the extreme outer-most radius of disc 204. However, as discussed in more detail below, a precise correlation of positioning between the OPU laser beam 246 and OPH laser beam 244 is also based on having zero average current offset applied to the fine actuator 218 of laser assembly 200.

FIGS. 3 and 4 illustrate one embodiment of a mechanical coupling 242 referred to herein as a rotary head-arm assembly 300. Although the mechanical coupling 242 is discussed herein with primary reference to the rotary head-arm assembly 300 embodiment shown in FIGS. 3 and 4, this is not intended to be a limitation as to the type or manner of mechanical coupling 242 that may be appropriate for use in disc drive system 128. To the contrary, various other types of mechanical couplings such as gear-train couplings, belt-drive couplings and other mechanical couplings between the OPU 212 and OPH 222 are also contemplated.

The rotary head-arm assembly 300 of FIGS. 3 and 4 includes a bottom-side or data-side arm 302 attached to the sled 210 through a first pivot joint 304. As the sled 210 and OPU 212 move in a radial direction 306 along sled rails 308 and sled drive mechanism 240, the motion of the sled 210 and OPU 212 is coupled through the data-side arm 302 and a second pivot joint 310 to a top-side or label-side arm 312. As discussed in greater detail below, sled 210 is moved in the radial direction 306 by stepper motor 228. The radial motion of the sled 210 and OPU 212 transfers through the label-side arm 312 to the OPH 222 attached to the label-side arm 312 toward the end that is opposite the second pivot joint 310.

It is noted that, depending on the type of mechanical coupling 242 employed, there may be geometric and/or other anomalies present in the coupling that prevent a direct, one-to-one tracking of the motion and position of the OPH 222 with the motion and position of the OPU 212. For example, in the rotary head-arm assembly 300 embodiment discussed above, it is apparent from the geometry of the head-arm assembly that a cosine error will be introduced in the positioning of the OPH 222 as it swings across the label side 208 of the disc 204 in the arc 400 (see FIG. 4). Accordingly, there may be a radial positioning offset between the OPU 212 and OPH 222 introduced by a particular mechanical coupling implementation. However, mathematical algorithms executable as part of a print control application 124, for example, can be introduced to eliminate such anomalies when positioning the OPH 222 for labeling a disc 204. For example, a radial position offset between the OPU and OPH caused by a mechanical coupling between the OPU and OPH can be calculated and used to determine a target data track for the OPU that will match a desired starting radial position for the OPH to begin marking a label on the label side of the disc. One skilled in the art would readily recognize particular anomalies introduced by particular mechanical couplings, as well as appropriate algorithms to compensate for such anomalies.

Regardless of the type of mechanical coupling 242 used to couple the motion of the OPU 212 to the OPH 222, accurate positioning of the OPH 222 on the label side 208 of disc 204 depends upon the positioning capability of the OPU 212, as noted above. Positioning the OPU 212 on the data side 202 of disc 204 to a desired radial position (i.e., a target data track) is generally accomplished in two main steps. The first step in positioning the OPU 212 to a target data track involves a coarse positioning of the sled 210 (i.e., coarse actuator) using full-resolution steps from step motor 228 along sled rails 308 and sled drive mechanism 240. Step motor controller 248, stored in memory 234 and executable on processor 232, first controls the step motor 228 to position the sled 210 (and OPU 212, etc.) through full-resolution step sizes (e.g., 150 micron steps, approximately 125 data tracks per full step) at a radial position that is within approximately 125 data tracks (or less) of a target data track.

Once the step motor controller 248 has roughly positioned the sled 210 within the vicinity of the target data track (i.e., corresponding to the desired radial position for the OPH to begin labeling) through step motor 228, the fine actuator controller 250 stored in memory 234 and executable on processor 232 performs a second positioning step to control the fine positioning of OPU laser beam 246 and to focus a laser spot directly onto the target data track. Fine actuator controller 250 controls the fine actuator 218 and, in turn, the OPU laser focusing lens 216 to provide fine positioning of OPU laser beam 246 in order to focus a laser spot onto the target data track.

Fine positioning is achieved by the fine actuator controller 250 serving power amplifier 252 up or down in the amount of output current being applied to fine actuator 218. In general, fine actuator 218 functions to move focusing lens 216 in a radial direction 242 in small increments in between the larger movements from the sled 210 (i.e., coarse actuator). Fine actuator controller 250 servos the average current output of power amplifier 252 in a direction that positions OPU laser beam 246 directly at a target data track of disc 204. Thus, after coarse positioning of sled 210, the fine actuator controller 250 applies an average current offset to the fine actuator 218 through power amplifier 252 in order to precisely position the OPU laser beam 246. Fine actuator 218 is typically capable of moving the laser spot of OPU laser beam 246 plus or minus approximately 200-300 tracks from its resting position, or zero-current position.

It should be apparent from FIG. 2 that only the first positioning step described above for positioning of the OPU 212 is applicable to positioning the OPH 222 on the label side 208 of disc 204. That is, only the coarse positioning/motion of the sled 210 is coupled through mechanical coupling 242 up to the OPH 222. The second, fine positioning step which moves the OPU laser 246 in small increments directly onto the target data track on the data side 202 of disc 204 provides no corresponding positioning or movement of the OPH 222 or OPH laser 224 on the label side of disc 204. This is because the fine positioning provided by fine actuator 218 is not coupled through the mechanical coupling 242 to the OPH 222, which is apparent from the illustration of FIG. 2. The OPH 222 motion tracks only with the motion of the sled 210, and not the motion of the OPU laser beam 246 being controlled by the fine actuator 218 on the sled 210.

However, controlling fine positioning of the OPH 222 is achieved by microstepping the sled 210 with step motor 228 while monitoring (through a closed feedback loop) the sled position and the current offset being applied to the fine actuator 218. Microstepping of step motors is well-known to those skilled in the art and will not be discussed in detail herein. In general, microstepping increases the position resolution of the sled 210 and is achieved through the step motor controller 248 electronically subdividing each full-resolution step of the step motor 228 into a larger number of smaller steps, or microsteps. Instead of applying a fixed positive or negative voltage to the stepper coils of step motor 228, microstepping makes use of varying voltage levels to vary the step size.

As discussed above, during normal positioning of the OPU 212 and OPU laser 214, feedback loop 254 provides a tracking error signal (e.g., positioning information of the sled 210 from the OPU 212 and current offset information from power amplifier 252) used for fine positioning. Fine positioning of the OPU laser beam 246 is achieved first, by coarse positioning of the sled 210 as controlled by step motor controller 248 in order to get the sled 210 and OPU 212 to a data track that is near a target data track (i.e. using full-resolution steps). Second, the OPU focusing lens 216 and OPU laser beam 246 are fine positioned onto a target data track by the fine actuator controller 250 using the tracking error signal to servo the OPU laser beam 246 to a target position that is relative to the center of the target track (e.g., a target position that is at the center of the target track or near the center of the target track by some known offset amount) by applying current through the power amplifier in closed loop fashion. Accordingly, through the mechanical coupling 242, the same tracking signal error and feedback loop 254 available for fine positioning the OPU laser beam 246, is also useful in positioning the OPH laser 224 and OPH laser beam 244 on the label side 208 of the disc 204. In general, the step motor controller 248 uses positioning information from the OPU 212 and fine actuator current information received through feedback loop 254 as the tracking error signal. Through feedback loop 254, step motor controller 248 tries to drive the average fine actuator current to zero by issuing microstepping commands to the stepper motor 228 while maintaining the OPU laser beam 246 in a locked position on the target data track.

As an example, suppose a label to be placed on the label side 208 of disc 204 is to begin at a radial position determined from label image data that is generated by a label design application 120 and converted for rendering on concentric circular tracks by an image processing application 122. A data track on the data side of disc 204 can then be determined (e.g., by print control application 124) that is located at a radius that matches the desired radial position for beginning the label. Thus, the data track having a radius that matches the desired label radial position becomes the target data track that can be used to precisely position the OPH 222 and OPH laser 224 at the correct radial location to begin labeling the disc 204.

In order to precisely position the OPH 222 and OPH laser 224 at the correct radial location, step motor controller 248 first controls step motor 228 to coarsely position sled 210 and OPU 212 within the vicinity of the target data track (i.e. using full-resolution steps to get within approximately 125 data tracks of the target track). The OPH 222 and OPH laser 224 move in correspondence with the sled 210 and OPU 212 through the mechanical coupling 242 as discussed above.

After this coarse positioning of sled 210, the fine actuator controller 250 uses the tracking error signal generated by the normal data side servo optics and electronics to servo the OPU laser beam 246 to a target position relative to the center of the target track (e.g., a target position that is at the center of the target track or near the center of the target track by some known offset amount) by applying current through the power amplifier 252 in closed loop fashion. At this point it is noted that OPH 222 and OPH laser 224 are not positioned directly opposite of the target data track on the label side 208 of disc 204, but are instead still positioned at a radial location corresponding to the coarse position of the sled 210. In order to precisely position the OPH 222 and OPH laser 224 on the label side 208 of disc 204 and opposite of the target data track, the step motor controller 248 monitors the tracking error signal (i.e., the radial position of OPU laser beam 246 and the average current offset being applied to the fine actuator 218) through feedback loop 254. Step motor controller 248 then microsteps step motor 228 to move sled 210 in small increments toward the target data track. With each microstep, step motor controller 248 monitors the OPU laser beam 246 position through positioning information from the OPU 212, and maintains a lock of OPU laser beam 246 on the target data track by instructing the fine actuator controller 250 to servo the OPU laser beam 246 to the center of the target track (i.e., a target position that is at the center of the target track or near the center of the target track by some known offset amount) by applying current through the power amplifier 252 to fine actuator 218 in closed loop fashion. Step motor controller 248 microsteps the sled 210 until the average current offset being applied to the fine actuator is zero, while the OPU laser beam 246 remains locked on the radial position of the target data track. At this point, it is apparent that the sled 210, and the OPH 222 and OPH laser 224 (via the mechanical coupling 242), will be positioned precisely at the target data track on the data side 202, which is the desired radial position on the label side 208.

Exemplary Methods

Figure 5:
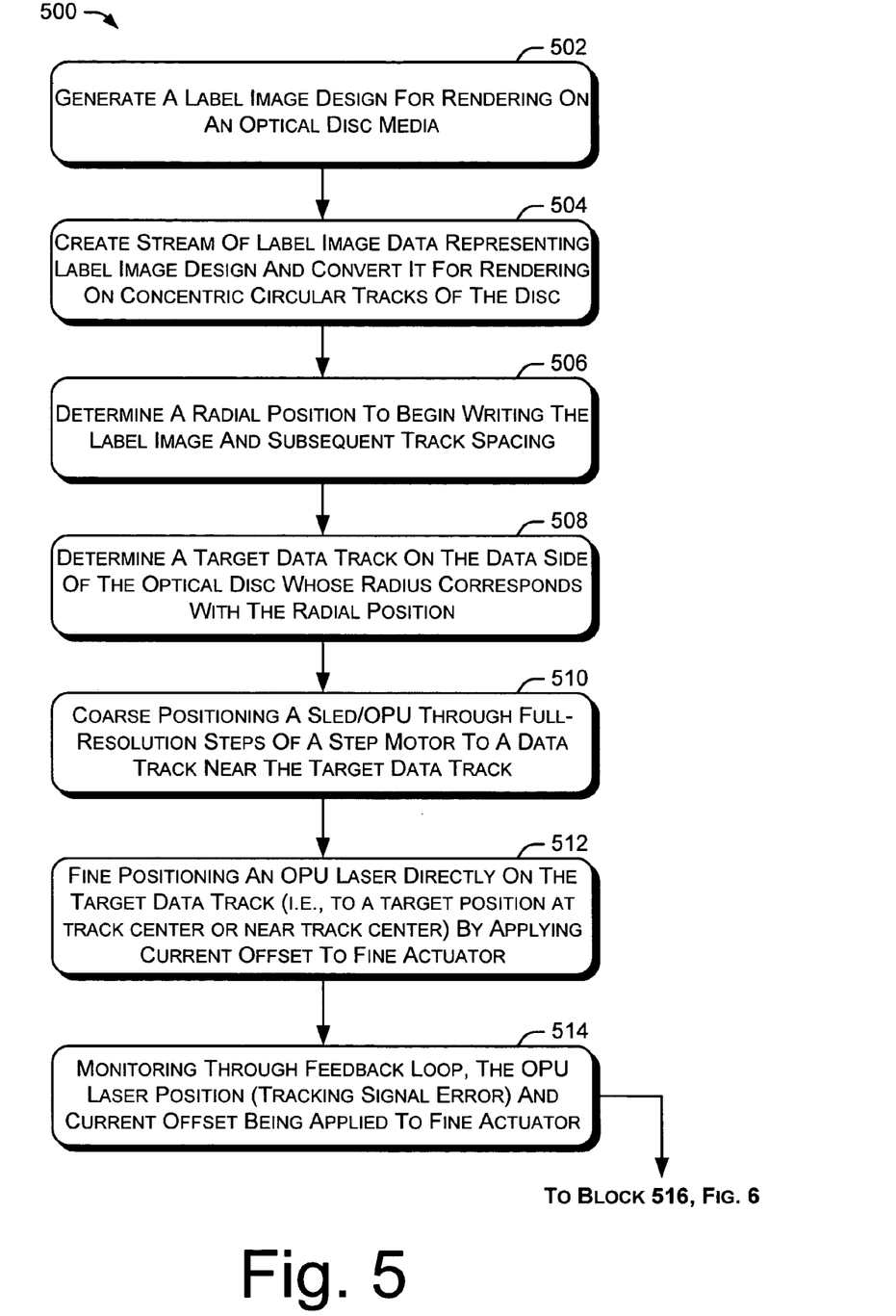
FIGS. 5-6 are flow diagrams illustrating exemplary embodiments of methods for positioning an optical print head.

Example methods for positioning an optical print head (OPH) 222 at the non-data/label side of an optical disc will now be described with primary reference to the flow diagrams of FIGS. 5 and 6. The methods apply generally to the exemplary embodiments discussed above with respect to FIGS. 1-4. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Method 500 begins at block 502, with generating a label image design to be rendered on a disc media such as an optical disc 204. In an exemplary embodiment, a label design application 120 generates a label design user interface 126 for display on display device 104. A user can then create a label image by specifying, or otherwise dragging-and-dropping text, a bitmap image, a digital photo, a graphic or symbol, and/or any combination thereof to create the label image on the user interface 126.

At block 504, the label image is converted into label image data that represents the label image. The label image data is then converted for rendering on concentric circular tracks of the optical disc. In an exemplary embodiment, an image processing application 122 processes the label image created with the label design user interface 126 to produce a data stream of label image data and laser control data to control rendering the image on concentric circular or spiral tracks of the optical disc 204. The data stream is formatted as laser control data and is augmented with other control commands to control the disc media marking device 102 rendering a label on the optical disc 204.

At block 506, a radial position for beginning to write the label image is determined from the label image data. Subsequent track spacing from the radial position is also determined. In an exemplary embodiment, a print control application 124 determines the radius of the first label track and the subsequent label track spacing. After the radius of the first track and the track spacing are determined, the print control application 124 determines which label image data will correspond to each respective track and laser mark locations are specified in a coordinate system where concentric circular tracks are defined in coordinates of the radial distance and the distance along each respective track.

At block 508, a target data track corresponding to the beginning radial position for the label is determined. Depending on the type of mechanical coupling 242 between the OPU and OPH, the radius of the target data track and the beginning radial position may correspond exactly, or they may correspond through a radial offset amount. This is because there may be geometric and/or other anomaly present in the mechanical coupling that prevents a direct, one-to-one tracking of the motion and position of the OPH 222 with the motion and position of the OPU 212. The rotary head-arm assembly 300 embodiment is discussed herein above as an example of a mechanical coupling that introduces an error in the positioning of the OPH with respect to the positioning of the OPU. As noted above, mathematical algorithms executable as part of a print control application 124, for example, can be introduced to eliminate such anomalies when positioning the OPH 222 for labeling a disc 204. Thus, at block 508, determining a target data track to correspond with the beginning radial position for labeling may involve determining a radial offset introduced by the mechanical coupling.

At block 510 of method 500, after a target data track has been determined, a coarse positioner positions the sled/OPU to a data track that is near the target data track and within one or more full-resolution steps of the step motor 228 moving the sled 210. Typically, this coarse positioning puts the sled/OPU to within approximately 125 data track or less of the target data track. The full-resolution steps of the step motor are controlled by a step motor controller 248.

At block 512, a fine positioner positions the OPU laser 246 directly on the target data track. Fine positioning of the OPU laser 246 is controlled by fine actuator controller 250 generating a feedback control signal output from power amplifier 252 which is applied to fine actuator 218. Fine actuator 218 controls the motion of focusing lens 216 which is capable of moving the focus position of OPU laser beam 246 approximately plus or minus 200-300 tracks on the optical disc 204 from a zero offset current position.

Once the OPU laser 246 is locked onto the target data track, the step motor controller 248 again controls step motor 228 to microstep the sled/OPU to the target data track. Through feedback control loop 254, step motor controller 248 monitors both the OPU laser 246 position (tracking signal error) to ensure it maintains a lock on the target data track, and the average offset current being applied to the fine actuator 218, as indicated at block 514.

Figure 6:
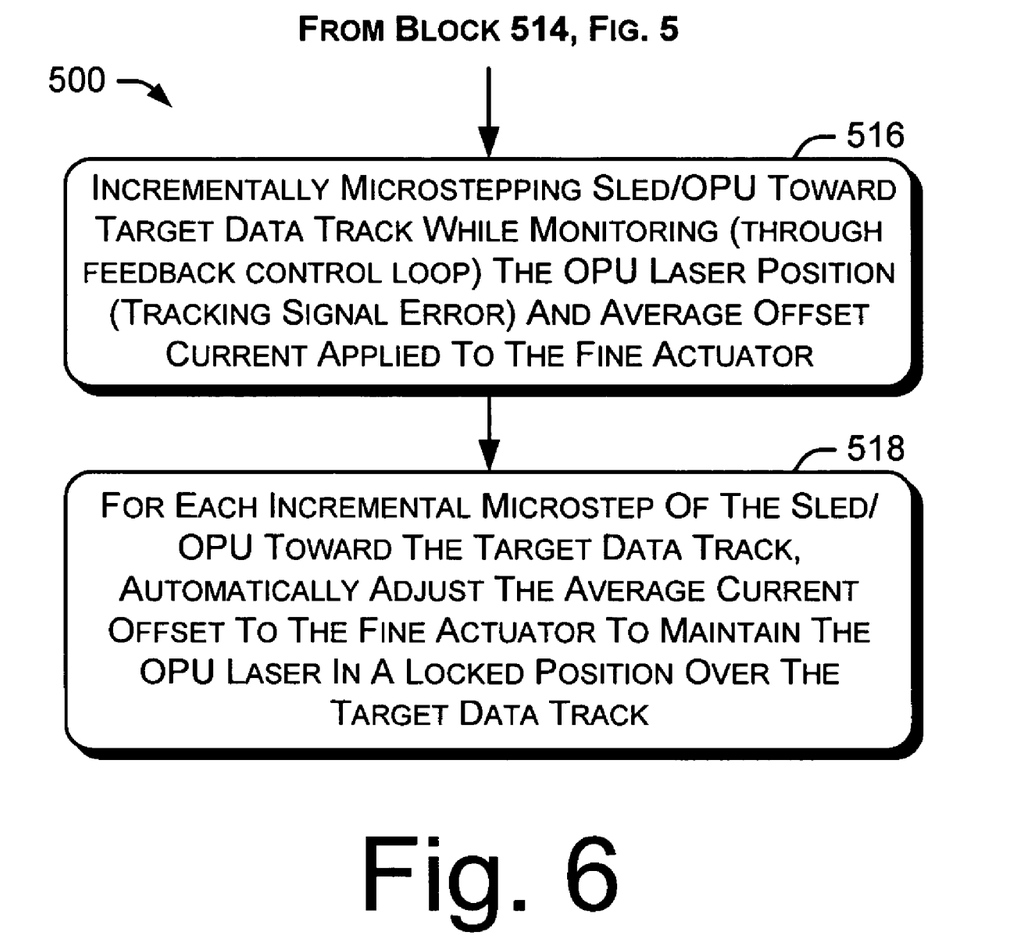

Block 516 of method 500 continues at FIG. 6. At block 516, the step motor controller 248 begins to incrementally microstep the sled/OPU in a direction toward the target track while monitoring (through feedback control loop 254) the OPU laser 246 position and average offset current applied to the fine actuator 218.

As indicated at block 518, for each incremental microstep of the sled/OPU in a direction toward the target track (made by the step motor controller 248 controlling the step motor 228), the fine actuator controller 250, through feedback loop 254, automatically adjusts the average current offset to the fine actuator 218 to maintain the OPU laser 246 in a locked position over the target track. It is apparent, that once the step motor 228 has been microstepped to where the average current offset is incremented to zero, the sled/OPU will be directly positioned at the target data track. In turn, through the mechanical coupling 242 between the OPU 212 and OPH 222, the OPH 222 and OPH laser 224 will be precisely positioned at the beginning radial position for labeling the optical disc with the image label.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   receiving label image data;
   determining a desired label position based on the label image data by matching a radial position indicated by the label image data with a data track having a radius which corresponds to the radial position, including executing a mathematical algorithm to compensate for a difference in position tracking between an optical print head (OPH) and an optical pickup unit (OPU) introduced by the mechanical coupling;
   determining a target data track from the desired label position;
   positioning the OPU at the target data track on a data side of an optical disc; and
   moving the OPH to the desired label position on a label side of the optical disc through a mechanical coupling between the OPU and the OPH.

2. A method as recited in claim 1, wherein the positioning comprises:
   stepping the OPU toward the target data track with a coarse positioner;
   monitoring a tracking signal error that tracks an OPU laser beam; and
   based on the tracking signal error, serving the OPU laser beam to a position relative to the center of the target data track by applying current to a fine positioner.

3. A method as recited in claim 2, wherein the positioning further comprises:
   incrementally microstepping the OPU with the coarse positioner; and
   with each incremental microstep of the OPU, automatically adjusting the average current offset to maintain a lock of the OPU laser beam on the target data track.

4. A method as recited in claim 3, wherein the microstepping comprises:
   receiving current information from a power source via a feedback control loop that indicates an amount of current being applied to the fine positioner;
   receiving position information from the OPU through the feedback control loop; and
   based on the current information and the position information, micro-stepping the OPU with the coarse positioner in a radial direction that reduces the average current offset applied to the fine positioner through the feedback control loop to maintain the lock of the OPU laser beam on the target data track.

5. A method as recited in claim 2, wherein stepping the OPU toward the target data track comprises moving a laser sled assembly to a data track near the desired data track within one or more full-resolution steps of a step motor.

6. One or more processor-readable media having processor-executable instructions configured for:
   receiving label image data;
   determining a starting radial position to begin printing the label image data on a label side of an optical disc;
   determining a target data track on a data side of the optical disc from the starting radial position;
   moving an optical pickup unit (OPU) on a data side of the disc to the target data track; and
   mechanically coupling motion of the OPU to an optical print head (OPH) on a label side of the disc such that the OPH is located at the starting radial position when the OPU is located at the target data track.

7. One or more processor-readable media as recited in claim 6, wherein the moving comprises:
   stepping a sled assembly within one or more full resolution steps of a step motor, to a data track that is near the target data track; and
   applying a current control to a fine actuator to fine position an OPU laser beam from the sled assembly onto the target data track.

8. One or more processor-readable media as recited in claim 7, wherein the moving additionally comprises:
   microstepping the sled assembly toward the target track; and
   verifying through a feedback control loop, that the OPU laser beam remains positioned on the target data track.

9. One or more processor-readable media as recited in claim 8, wherein the verifying comprises:
   monitoring the position of the OPU laser beam during the microstepping; and
   automatically adjusting the current control to the fine actuator to maintain the OPU laser beam on the target data track.

10. One or more processor-readable media as recited in claim 6, wherein determining a target data track comprises locating a data track whose known radial position matches the starting radial position.

11. One or more processor-readable media as recited in claim 6, wherein determining a target data track comprises:
    calculating a radial position offset between the OPU and OPH caused by a mechanical coupling between the OPU and OPH; and
    determining the target data track from the starting radial position and the radial position offset.

12. A disc media marking system comprising the one or more processor-readable media of claim 6.

13. A disc media marking system comprising:
    an optical pickup unit (OPU) configured to read data from a data side of an optical disc; an optical print head (OPH) configured to print a label image on a label side of the optical disc, wherein the data side and label side are opposite sides of the optical disc;
    an executable label design application configured to generate the label image based on user input;

an executable image processing application configured to produce label image data representing the label image and to convert the label image data to laser control data to control rendering the label image on concentric circular tracks of the optical disc; and, an executable print control application configured to determine from the label image data, a radial position to begin writing the label image, and to determine a target data track on the data side of the optical disc that corresponds with the radial position.

14. A disc media marking system as recited in claim 13, further comprising a mechanical coupling between the OPU and OPH, the mechanical coupling configured to couple motion of the OPU to the OPH.

15. A disc media marking system as recited in claim 14, wherein the mechanical coupling is a mechanical coupling between the OPH and any component of a laser assembly associated with motion of the OPU.

16. A disc media marking system as recited in claim 13, further comprising a coarse positioner configured to step the OPU to a radial location on the data side that is near a target data track.

17. A disc media marking system as recited in claim 16, further comprising a fine positioner configured to position an OPU laser directly on the target data track using a current offset.

18. A disc media marking system as recited in claim 17, further comprising a feedback loop configured to provide OPU location information and current offset information to the coarse positioner, the coarse positioner further configured to microstep the OPU directly to the target data track while monitoring the OPU location information and current offset information.

19. A disc media marking system as recited in claim 16, wherein the coarse positioner comprises:
   a sled for carrying the OPU and an OPU laser;
   a step motor for stepping the sled along a sled rail in a radial direction of the optical disc; and
   a step motor driver for controlling the step motor.

20. A disc media marking system as recited in claim 16, wherein the fine positioner comprises:
   a focusing lens configured to move an OPU laser beam in a radial direction of the optical disc and to focus the OPU laser beam on a target data track;
   a fine actuator configured to control the focusing lens;
   a power amplifier configured to supply a current offset to the fine actuator; and
   a fine actuator driver configured to control the current offset supplied by the power amplifier.

21. A disc media marking system comprising:
   means for positioning an optical pickup unit (OPU) at a target data track on a data side of an optical disc;
   means for coupling motion of the OPU to motion of an optical print head (OPH) at a label side of the optical disc, so as to position the OPU at the target data track positions the OPH at a desired radial position for printing a label on the label side of the optical disc; and,
   means for generating label image data;
   means for converting the label image data for rendering on concentric circular tracks;
   means for determining the desired radial position from the converted label image data; and
   means for determining the target data track from the desired radial position.

22. A disc media marking system as recited in claim 21, wherein the means for positioning the OPU comprise:
   means for stepping the OPU to a data track that is close to the target data track; and
   means for focusing an OPU laser beam directly on the target data track.

23. A disc media marking system as recited in claim 21, wherein the means for positioning the OPU additionally comprise:
   means for locking the OPU laser beam on the target data track; and
   means for micro-stepping the OPU directly to the target data track while the OPU laser beam remains locked on the target data track.

24. A disc media marking system as recited in claim 23, wherein the means for locking the OPU laser beam on the target data track comprises:
   means for providing feedback information on an amount of current being applied to a fine actuator; and
   means for providing feedback information on a position of the OPU laser beam.

25. A disc media marking system as recited in claim 21, wherein the OPU comprises means for reading data from and writing data to the data side of the optical disc, and the OPH comprises means for writing a label on the label side of the optical disc.

26. A disc media marking system as recited in claim 21, wherein the means for coupling motion of the OPU to motion of the OPH comprises means for mechanically coupling the OPU to the OPH.

* * * * *